(12) United States Patent
Clark et al.

(10) Patent No.: US 7,571,600 B2
(45) Date of Patent: Aug. 11, 2009

(54) METHOD AND APPARATUS FOR REDUCING POLLUTANTS IN ENGINE EXHAUST

(75) Inventors: Nigel N Clark, Morgantown, WV (US); Christopher M. Atkinson, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 31 days.

(21) Appl. No.: 11/272,739

(22) Filed: Nov. 15, 2005

(65) Prior Publication Data

US 2006/0107654 A1    May 25, 2006

Related U.S. Application Data

(60) Provisional application No. 60/629,299, filed on Nov. 19, 2004.

(51) Int. Cl.
*F01N 3/00* (2006.01)
(52) U.S. Cl. .............................. 60/286; 60/274; 60/295; 60/301; 60/303
(58) Field of Classification Search .................. 60/274, 60/286, 287, 288, 295, 301, 303
See application file for complete search history.

(56) References Cited

U.S. PATENT DOCUMENTS

| | | | | |
|---|---|---|---|---|
| 2,946,651 A | * | 7/1960 | Houdry | 423/212 |
| 4,418,046 A | * | 11/1983 | Izumo et al. | 423/245.1 |
| 5,607,650 A | * | 3/1997 | Debbage et al. | 422/178 |
| 5,762,885 A | * | 6/1998 | Debbage et al. | 422/171 |
| 6,293,096 B1 | | 9/2001 | Khair et al. | |
| 6,560,958 B1 | * | 5/2003 | Bromberg et al. | 60/275 |
| 6,775,973 B2 | * | 8/2004 | Liu et al. | 60/301 |
| 6,955,042 B1 | * | 10/2005 | Wnuck et al. | 60/286 |
| 7,003,946 B2 | * | 2/2006 | Preis et al. | 60/286 |
| 2003/0086850 A1 | * | 5/2003 | Jobson et al. | 423/213.2 |

OTHER PUBLICATIONS

International Search Report dated Apr. 4, 2008 (Four (4) pages).
Form PCT/ISA/237 Form (Five (5) pages).

* cited by examiner

*Primary Examiner*—Thomas E Denion
*Assistant Examiner*—Diem Tran
(74) *Attorney, Agent, or Firm*—Crowell & Moring LLP

(57) ABSTRACT

A transmural catalysis device allows for conversion of NOx into $N_2$ in internal combustion engine exhaust. A reducing gas is delivered into exhaust tubes through a plurality of pores or channels in the walls of the exhaust tubes either continuously or periodically. Also disclosed are methods using the device for reduction of NOx and automotive vehicles comprising the device.

41 Claims, 4 Drawing Sheets

EXTRUSIONS – EXAMPLES

S1 HEXAGONAL

S2 OCTAGONAL-SQUARE

S3 SQUARE

EXTRUSIONS - EXAMPLES

| E | E | E | E |
|---|---|---|---|
| R | R | R | R |
| E | E | E | E |
| R | R | R | R |

S4 SQUARE

FIG.1d

| E | E | E |
|---|---|---|
| R | R | R |
| E | E | E |
| R | R | R |
| E | E | E |
| R | R | R |
| E | E | E |

S5 RECTANGLES
SAME FOR E & R

FIG.1e

| E | E | E | E |
|---|---|---|---|
| R | R | R | R |
| E | E | E | E |
| R | R | R | R |

S6 RECTANGULAR
DIFFERENT FOR E & R

FIG.1f

METHOD AND APPARATUS FOR REDUCING POLLUTANTS IN ENGINE EXHAUST

CROSS REFERENCE TO RELATED APPLICATIONS

The present application claims priority under 35 U.S.C. § 119(e) to provisional application, No. 60/629,299, filed Nov. 19, 2004, the entire contents of which are expressly incorporated herein by reference.

BACKGROUND OF THE INVENTION

Catalysts for cleanup of internal combustion engine exhaust gases conventionally consist of an optionally porous honeycomb of ceramic tubes. Exhaust gas flows axially through the exhaust tubes with reactions taking place at active sites on the tube walls. These reactions convert pollutant compounds in the exhaust gas into environmentally acceptable compounds. Diffusion of gaseous pollutant chemical species from the bulk, axial exhaust gas flow to the active surface sites located on the walls is needed to achieve high conversion—either oxidation or reduction of pollutant species.

Particulate filters used for diesel exhaust particulate matter reduction may consist of a honeycomb of tubes having porous walls. The exhaust gas is forced to flow through the porous walls, such as by blocking alternate ends of adjacent tubes, and the particulate matter is captured in the pores where the particulate matter may be catalytically oxidized.

Current conventional diesel engines create exhaust flows having a NOx content of anywhere from 0 ppm NOx at no load to 2000-5000 ppm NOx at full load. In the context of the present invention, NOx is used to mean any and all oxide of nitrogen, including but not limited to NO, $NO_2$, and $N_2O$. At present, there is no exhaust after-treatment technique capable of causing diesel engines to meet the standards for emissions proposed by the U.S. EPA to take effect in 2010. NOx reduction catalysts ("lean NOx catalysts") using fuel injection ahead of the catalyst do not offer the 90% or greater reduction in NOx levels required by the EPA 2010 standards. Selective catalytic reduction technology requires the injection of some additional reductant such as urea, which is not favored and further requires careful control to avoid ammonia slip. NOx adsorber technology shows promise but does not provide the reductions required over a broad operating range.

A problem with diesel exhaust NOx reduction is that excess oxygen is typically present in the exhaust, while the exhaust temperature and exhaust species of interest can vary significantly in concentration and amount. Any scheme which provides for the reduction of NOx must either a) avoid reactions between this excess oxygen and nitrogen or the added reductant, or b) provide adequate reducing agent that the exhaust mixture composition approaches the composition of exhaust from combustion at a stoichiometric air-fuel ratio.

NOx absorber or trap technology utilizes rare earth absorption sites that serve to trap NOx molecules under lean conditions, i.e., with an excess of oxygen in the fuel/air mixture. The adsorption sites are periodically regenerated by injection of sufficient reductant such that the overall amount of oxygen in the exhaust is reduced to a negligible level (reductant rich). The reduction reaction is then promoted at or near the adsorption sites, producing elemental nitrogen and oxidized products such as water and/or carbon dioxide. The regenerated sites are then available for further NOx absorption. The drawbacks of this approach are the periodic requirement of having a reductant rich exhaust and the associated inherent inefficiency in transporting the reductant to the active sites. These drawbacks lead to significant fuel efficiency penalties and problems in controlling the exhaust composition.

The above-described problems exist not only in diesel engines, but also in other type of engines as well, regardless of whether the engine is compression ignited or spark ignited, or whether the fuel is diesel, gasoline natural gas, alcohols, hydrogen or some alternative liquid or gaseous fuel. What is needed is an improved method and apparatus for reducing the level of NOx emissions in internal combustion engine exhaust gases. The method and apparatus should minimize losses in fuel efficiency and/or minimize the amount of added reductant or reactant. The method should also allow for low cost of operation. The method and apparatus should further be adaptable to conventional internal combustion engine designs.

SUMMARY OF THE INVENTION

The need for improved processing of internal combustion engine exhaust is met by the transmural catalysis method and apparatus provided in this invention. The present invention provides for efficient conversion of NOx in exhaust gases to elemental nitrogen and other oxides while maintaining high fuel efficiency and minimizing operating costs. The methods and apparatus of the present invention are also applicable generally for conversion of chemical species in an exhaust stream or other types of gas streams.

In the context of the present invention, the term "transmural" means that two conduits for two gas streams, for example, the exhaust gas and a second, reducing gas stream, are in fluid communication with each other through the walls of the conduits, for example by pores or through channels in the wall. For example, according to the present invention, as exhaust gas flows through the exhaust conduits, NOx are adsorbed at surface adsorption sites. A reducing agent is periodically introduced into the exhaust conduits via a plurality of pores or channels arranged along the length and perimeter of each conduit. The reducing agent reacts with the adsorbed NOx to convert them into other gases, such as $N_2$, $CO_2$, and $H_2O$.

In another embodiment, the invention provides for processing of the exhaust gas of an internal combustion engine by flowing the exhaust gas through one or a plurality of exhaust conduits. A reducing gas is flowed through one or a plurality of secondary conduits. The exhaust conduits and the secondary conduits are in fluid communication with each other through the pores or channels in the walls of the conduits. The reducing gas flow may be continuous, or it may periodically change its flow characteristics. The reducing gas is introduced into the exhaust conduit(s) via pores or channels that connect each exhaust conduit to one or more of the secondary conduits, thus allowing for continuous or periodic conversion of oxides of nitrogen in the exhaust flow.

The invention also provides an apparatus for performing the transmural catalysis reaction described above. In an embodiment, the exhaust structure comprises one or a plurality of exhaust conduits in fluid communication with an engine to receive exhaust gas from an internal combustion reaction. The exhaust structure also has one or a plurality of secondary conduits, wherein each exhaust conduit is in fluid communication with at least one secondary conduit via a plurality of pores on the walls connecting the exhaust conduits and secondary conduits. A reducing agent reservoir is connected to the secondary conduits for delivery of a reducing agent to the secondary conduits.

BRIEF DESCRIPTION OF THE FIGURES

FIGS. 1a-1f depict possible embodiments for an exhaust structure according to the invention.

DETAILED DESCRIPTION OF THE EMBODIMENTS

Figure 1A:
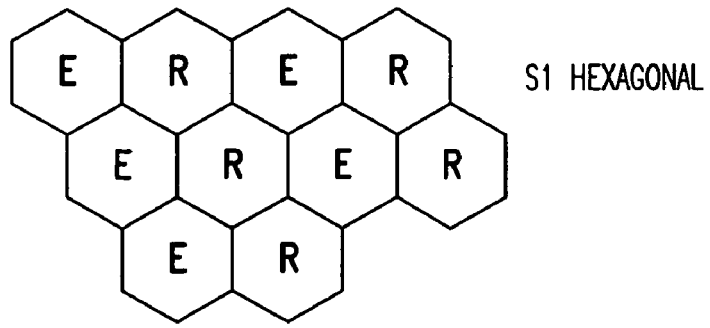

The exhaust of internal combustion engines typically contains a mixture of nitrogen, oxygen, oxides of nitrogen, carbon monoxide, carbon dioxide, water vapor, various hydrocarbons including unburned fuel and partial combustion products, sulfur-containing compounds, and particulate matter such as ash and elemental carbon. In order to reduce air pollution, it is desirable to reduce or eliminate NOx in the exhaust. This invention provides a cost-effective method for reducing the nitrogen oxides to nitrogen while maintaining high fuel efficiency for the engine.

In an embodiment, exhaust from a diesel engine is passed into a plurality of exhaust conduits. The walls of the exhaust conduits are composed of a material having numerous pores or channels so that gases can pass into and out of the exhaust conduits or between adjacent conduits. The exhaust conduit walls, including the pores and/or channels, are coated with a washcoat of a catalyst that provides catalytic sites for reduction of NOx into nitrogen. In an embodiment, the catalyst is a precious metal catalyst. The surfaces of the exhaust conduit walls, including the pores or channels, are also impregnated with adsorption sites for adsorbing oxides of nitrogen.

The plurality of exhaust conduits are interspersed with a plurality of secondary conduits. In an embodiment, the walls of the plurality of secondary conduits are composed of the same material as the walls of the exhaust conduits. The exhaust conduits and secondary conduits are arranged so that the secondary conduits are in fluid communication with the exhaust conduits via the pores and channels mentioned above. The secondary conduits are connected to a source of a reducing gas. Due to the arrangement of the exhaust conduits and secondary conduits, flow between the conduits can be controlled by varying the pressure in the two types of conduits. By increasing the pressure in the secondary conduits, the reducing gas can be forced into the exhaust conduits in order to reduce NOx.

In an embodiment, reduction of the NOx occurs selectively at the reduction sites on the surface of the exhaust conduits. By delivering the reducing gas through channels in the exhaust conduit, the reducing gas enters the exhaust conduits near the surface where it can be used for reduction of NOx. This minimizes the loss of reducing agent to other side reactions that can occur between the reducing agent and the components of the exhaust gas. Additionally, because the reducing gas is introduced through the walls of the exhaust conduit, there is no need to introduce large amounts of reducing gas into the main exhaust. Even periodic introduction of large amounts of reducing gas into the main exhaust can lead to reduced fuel efficiency.

This invention provides a method for improving the reduction of NOx to $N_2$. This is achieved in part by using catalytic reduction of NOx. In an embodiment, the reaction between NOx and a reductant is catalyzed by an active site on a surface. The active site can be on the surface of the walls of an exhaust conduit, or in one of the pores or channels leading from an exhaust conduit to a secondary conduit. In an embodiment, the active site represents a precious or noble metal catalyst site, such as containing palladium (Pd), platinum (Pt), or rhodium (Rh) metal atoms, or a base metal site or sites, or a rare earth oxide site or sites.

The specific reactions involved in the reduction of NOx will depend on the reductant used. For example, a conventional reactant for reducing NOx to $N_2$ is ammonia. In an embodiment, the simplified chemical reactions corresponding to a reaction pathway for conversion of NO and $NO_2$ to $N_2$ using $NH_3$ are:

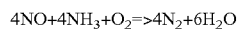
$$4NO+4NH_3+O_2 \Rightarrow 4N_2+6H_2O$$

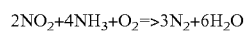
$$2NO_2+4NH_3+O_2 \Rightarrow 3N_2+6H_2O$$

Other choices of reductant will involve other chemical reactions and/or reaction pathways to arrive at the same result of converting NOx to $N_2$.

The precious metal active sites can be formed on an exhaust apparatus according to the invention using any coating or impregnating method known in the art to those ordinarily skilled. In an embodiment, the precious metals sites are formed by applying a washcoat to the apparatus using a conventional technique. For example, modern exhaust emission control catalysts utilize monolithic flow-through supports (made of refractory or ceramic material such as zeolite, or cordierite), coated with inorganic oxides (to provide specific high surface area as well as chemical storage capability) and then doped with catalytic precious metals. The coating of the catalyst substrate is usually performed in two steps, namely washcoating (or laying down of the inorganic oxide layer) and then the impregnation of the washcoated support with one or more noble metals.

The washcoat is a porous layer with high specific surface area, physically or chemically bonded to the surface of a support. Washcoat materials include inorganic base metal oxides or carbonates of aluminum, silicon, titanium, cerium, zirconium, vanadium, barium, praseodymium, neodymium and lanthanum (such as $BaCO_3$, $Al_2O_3$, $SiO_2$, $TiO_2$, $CeO_2$, $ZrO_2$, $V_2O_5$, $La_2O_3$) and zeolites (alumina silicates). These materials perform the function of catalyst carriers, chemical reaction promoters, catalysts and/or thermal stabilizers. Washcoats are typically applied to the catalyst support from water-based slurries. The wet washcoated catalyst is then dried and calcined at high temperatures. The precious metal catalyst material is then usually applied in a second step called impregnation. During the impregnation, the washcoated monolith is exposed to a water-based solution containing catalytic precursors. The supported catalyst is then dried and calcined to its final form. During calcination, the catalyst precursors decompose to form the final catalyst, usually a metal or a metal oxide. Suitable catalytic materials include precious or noble metals such as platinum (Pt), palladium (Pd) and rhodium (Rh).

The method of impregnating the exhaust structure surface with a precious metal catalyst is designed to produce a finely divided catalyst on the surface. The resulting surface has active sites distributed across the surface to facilitate conversion of NOx molecules to $N_2$.

Additionally, in a washcoat according to the invention, a material that acts as an adsorption or trap site for NOx can be included. One trap material is barium carbonate. When exhaust gas is passed through an exhaust structure according to the invention, NOx molecules will approach the surface of the structure e.g. due to diffusion or turbulence in the flow. If, for example, a reductant is only periodically being passed into the exhaust structure, the trap sites can capture NOx molecules and hold the molecules at the surface. When a reductant is introduced to the exhaust structure, the NOx molecules are displaced by the reductant and converted to $N_2$ at a catalyst site.

In an embodiment where the adsorption site is barium carbonate, the adsorption reaction can occur according to the equation:

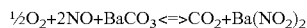

$$\tfrac{1}{2}O_2+2NO+BaCO_3<=>CO_2+Ba(NO_2)_2$$

In embodiments that include adsorption sites on the surface of the wall of the exhaust tube, the reductant flow preferably contains CO, which allows the adsorption site to be regenerated during a period when reducing agents are flowing in the exhaust structure.

The method and apparatus of the present invention are particularly suitable for reducing NOx in the exhaust gas from a diesel engine. The exhaust gas from diesel internal combustion engines contains a number of components. Diesel exhaust typically includes nitrogen, oxygen, carbon dioxide, oxides of nitrogen, carbon monoxide, water vapor, various hydrocarbon species and volatile organic compounds (including unburned fuel, lubricant, and products of partial combustion), sulfur-containing compounds, and suspended particulate matter which contains elemental carbon, organic carbon, acid, and ash.

Although ammonia was used in the above description of the catalyzed reduction of nitrogen oxides to $N_2$, a variety of other substances can also be used in this invention. Potential reducing agents include evaporated diesel, evaporated gasoline, other evaporated hydrocarbons, carbon monoxide, hydrogen, urea, ammonia, a combination of any of these reducing agents, or any of these reducing agents carried in a slipstream of exhaust gas.

Figure 2:
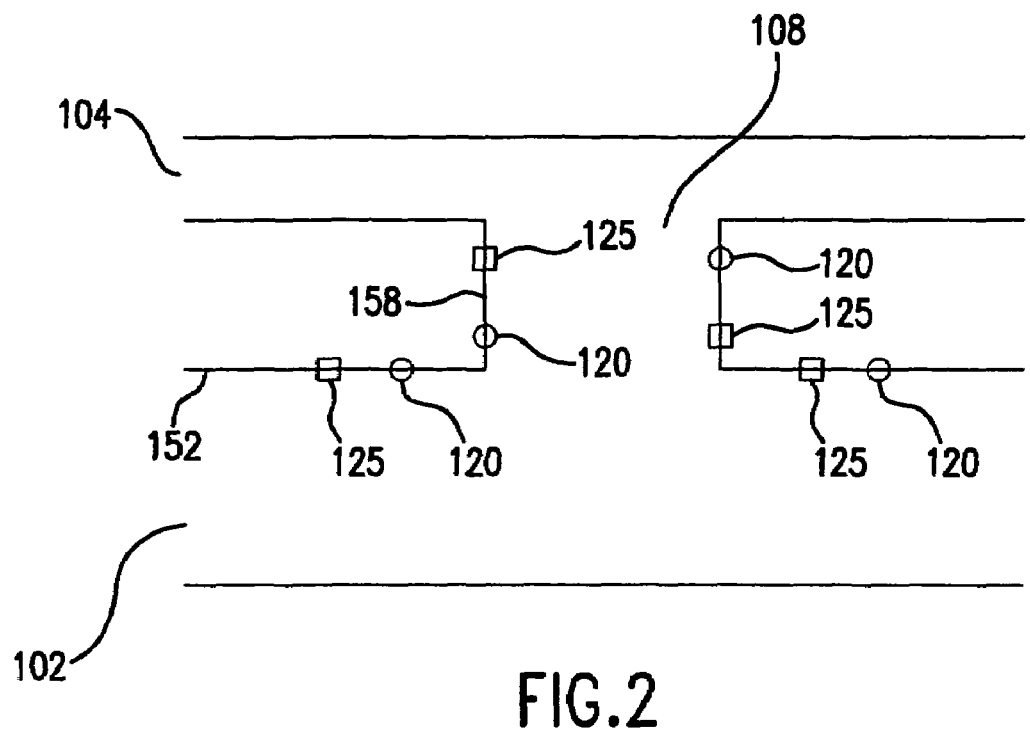
FIG. 2 schematically shows a pore or channel in an exhaust structure according to an embodiment of the invention.

The walls of the exhaust structures of this invention have a porous nature, or alternatively have numerous channels that connect adjacent tubes or conduits in the exhaust structure. FIG. 2 schematically shows an exhaust tube 102 in the vicinity of a pore 108 connecting the exhaust tube 102 and secondary tube 104. The representation of the pore 108 in FIG. 2 is shown for ease of viewing and understanding, and is not intended to represent the size or scale of a pore relative to an exhaust structure.

As shown in FIG. 2, pore 108 provides a pathway for reducing agents flowing in secondary tube 104 to enter exhaust tube 102. Two types of reaction sites are shown on surface 152 of exhaust tube 102, and surfaces 158 of pore 108. One type of reaction site is an adsorption or trap site 120. In an embodiment, adsorption site 120 represent a barium carbonate site. As an exhaust flow passes through exhaust tube 102, NOx molecules will exchange with $CO_2$ at the adsorption site, binding the NOx molecule until it is displaced. The other type of reaction site is a catalyst site 125. The catalyst site represents a precious or noble metal location on the surface, such as a Pt, Pd, or Rh site. The catalyst site facilitates reaction between NOx molecules and reducing agents for conversion of NOx molecules into $N_2$.

Figure 3:
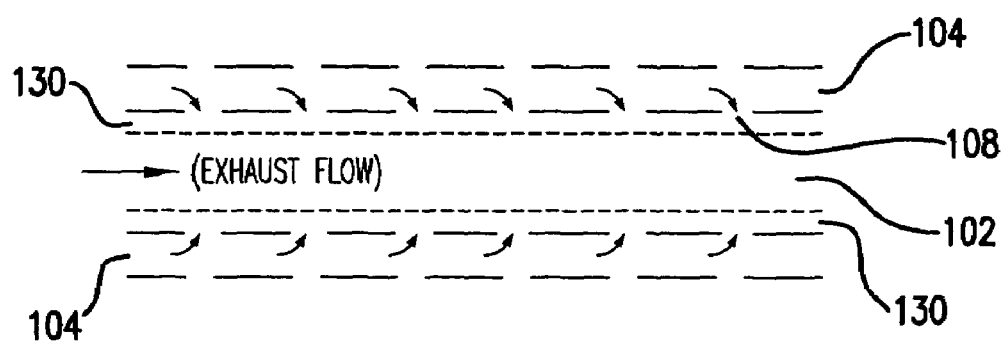
FIG. 3 schematically shows a side view of a portion of an exhaust structure according to an embodiment of the invention.

FIG. 3 provides a larger scale view of an exhaust tube 102 and adjacent secondary tubes 104. The arrows in FIG. 3 represent flow of reducing agent from secondary tube 104 into exhaust tube 102 via pores or channels 108. This flow of reducing agent creates a thin "reducing layer" 130 within exhaust tube 102. Thus, although the total flow in exhaust tube 102 is still primarily exhaust in character, the reducing layer allows for conversion of NOx molecules to $N_2$ at catalyst sites on the surface of exhaust tube 102.

In embodiments involving continuous flow of the reductant, the pressure in the secondary tubes is maintained at a higher level than the pressure in the exhaust tubes. This insures that the direction of flow is from the secondary tubes into the exhaust tubes. In other embodiments, the secondary tubes can be capped so that flow into the secondary tube cannot directly exit the exhaust structure. Instead, any flow entering a capped secondary tube must pass through a pore or channel into an exhaust tube to exit the exhaust structure. This type of structure is beneficial, for example, when the reductant flow is periodic. The capped structure facilitates the buildup of pressure in the secondary tubes when the reducing agent is flowing into the secondary tubes. Additionally, during times when there is no reductant flow, the exhaust will not tend to enter the secondary tubes.

According to one embodiment of the invention, an exhaust structure having primary exhaust tubes that are positioned adjacent to secondary tubes that carry the reductant flow. During operation of an internal combustion engine, the flow through the exhaust tubes will be continuous or substantially continuous. The reductant flow can also be delivered continuously, or the reductant can be delivered periodically. In an embodiment, the reductant flow can be at least 0.1%, or at least 0.5%, or at least 1.0% of the total exhaust volume flow. In another embodiment, the reductant flow can be 10% or less, or 5% or less, or 2% or less of the total exhaust volume flow. In embodiments where the reductant flow is periodic, the reductant flow can alternate between two flow rates. In an embodiment, a periodic reductant flow alternates between no flow and a flow of 10% or less, or 5% or less, or 2% or less.

Figure 1B:
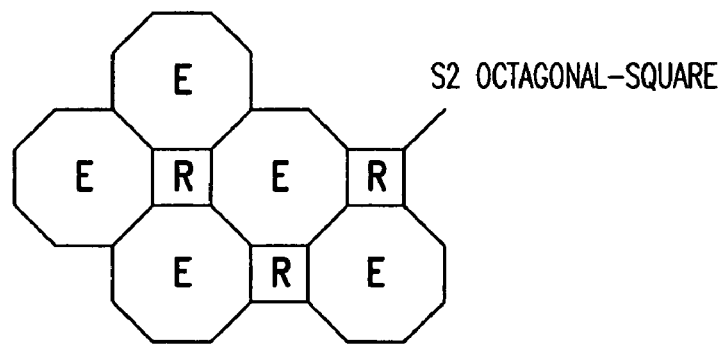
Figure 1C:
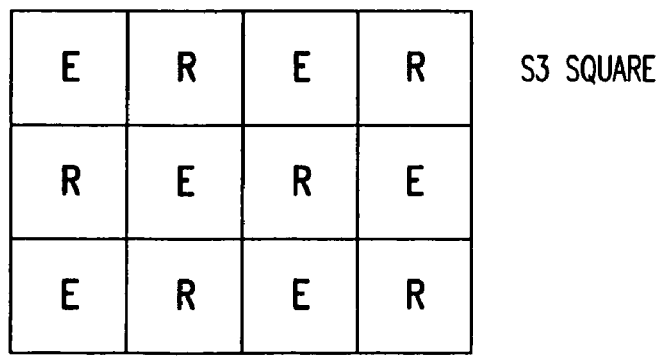

According to the invention, the reductant is contacted with NOx in the exhaust by passing the reductant through pores or channels that connect the exhaust tubes with the secondary, reductant tubes carrying the reductant flow. A variety of tube configurations can be used to achieve this. FIG. 1a—1f depict several possible configurations. The configurations shown in FIGS. 1a-1f are designed to accommodate a variety of factors. For example, FIGS. 1a and 1d show configurations which would employ a simple manifold design for delivery of the exhaust and reductant flows to the indicated tubes. Such configurations allow for easy ducting of reducing gas to the secondary tubes. FIGS. 1b and 1c depict configurations where the contact area between the exhaust and secondary tubes is maximized. Additionally, FIG. 1e depicts a configuration involving rectangular tubes. In FIG. 1e, all of the tubes have the same cross-sectional area. However, those of skill in the art will recognize that ratio of the length to the width of the rectangles can be varied. By varying the dimensions of the rectangle, the amount of contact surface area between the exhaust and secondary tubes can be modified. Additionally, in an embodiment, the height of the exhaust and secondary tubes can be varied independently, leading to larger tubes for the exhaust flow and smaller tubes for the reductant flow. (As drawn in FIG. 1e, the widths would be held constant, to maintain alignment of the tube boundaries.) FIG. 1f depicts a geometry similar to 1e, but with a design that allows for a simpler manifold. Many other geometries for the exhaust structure are suitable for the present invention and can be readily designed by those of ordinary skill in the art.

The following provides an example of operation of a transmural catalysis device according to an embodiment of the invention. Exhaust gas containing NOx at a level higher than is desirable or permitted by government standards leaves an engine. The exhaust gas passes through a transmural catalysis device of the present invention, consisting of e.g. a ceramic monolith encased in a metal enclosure. The monolith consists of exhaust tube(s) and secondary tube(s) having porous walls, with active sites in the pores and on the walls of the tubes. The active sites are composed of both a NOx storage medium (such as barium oxide or carbonate) and NOx reducing catalyst species (metals). The exhaust gas passes through selected tubes in the monolith (the exhaust flow tubes), but is unable to pass through the remaining tubes (reductant or secondary flow tubes) because they are blocked to the flow. Instead, a reducing gas flow is directed through the secondary flow tubes. The reducing gas flow may be composed of a slipstream of exhaust gas which is withdrawn from the engine or the exhaust system upstream of the transmural catalysis device and is mixed with fuel or other reductant. The flow of exhaust in the slipstream is small in comparison to the flow in the main stream of exhaust gas. The flow of fuel or other reductant into the reducing gas flow stream is managed by a control system that is commanded either by an independent processor or the engine control module.

The diesel fuel and exhaust slipstream is fed cyclically to the secondary tubes via a manifold. The cyclic flow is effected with a valve managed by a control system. The cyclic flow is characterized by periods of fuel and exhaust slipstream flow into the secondary tubes (reducing flow) and by periods when there is no such flow (no-flow). During no-flow periods NOx in the main exhaust stream are deposited at the barium oxide sites. By contrast, during reducing flow periods the fuel and exhaust slipstream mixture is fed to the reductant tubes. This reducing flow passes into and through the pores that connect the exhaust and secondary tubes, creating a local layer of reducing medium near the walls of the exhaust tubes. This results in both the regeneration of the barium oxide of sites to allow for future capture of nitrogen containing species, as well as in the reduction or conversion of NOx in the local reducing medium near the walls. The cyclic frequency is determined by considering, inter alia, the quantity of NOx to be removed, and the storage capacity of the transmural catalysis device. The transmural catalysis device is sized to effect a sufficiently high capture of oxides of nitrogen, while the flow rate of diesel reductant is determined by the quantity of oxides of nitrogen to be removed.

Figure 4:
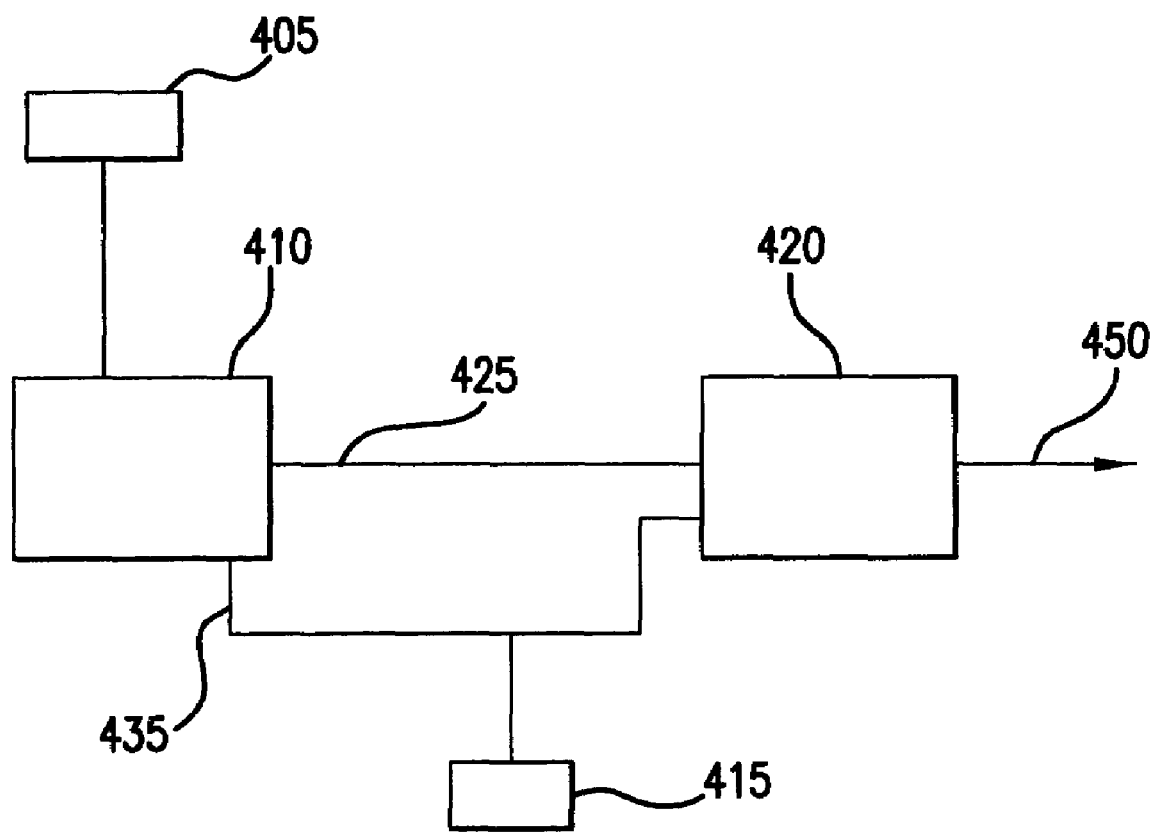
FIG. 4 schematically shows an apparatus in accordance with an embodiment of the invention.

FIG. 4 provides an example of an internal combustion device employing a transmural catalysis device according to an embodiment of the invention. Fuel reservoir 405 provides a fuel, such as diesel fuel, to internal combustion engine 410. The exhaust gas 425 from engine 410 is passed into the exhaust tubes of transmural catalysis device 420. Reducing agent reservoir 415 provides a reducing agent to the secondary tubes of transmural catalysis device 420. In the embodiment shown in FIG. 4, the reducing agent is combined with a slipstream 435 of exhaust gas before entering the secondary tubes. In an embodiment, a control valve (not shown) can be included in the conduit connecting reducing agent reservoir 415 with transmural catalysis device 420. In another embodiment, a control valve (not shown) can be included in the conduit connecting slipstream 435 with transmural catalysis device 420. In an embodiment where diesel fuel is used as a reductant, reducing agent reservoir 415 and fuel reservoir 405 can be a single reservoir. After passing through the transmural catalysis device 420, the exhaust gas 450 exits the vehicle through a conventional exhaust path.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof. Furthermore, the teachings and disclosures of all references cited herein are expressly incorporated in their entireties by reference.

What is claimed is:

1. A method for processing exhaust gas of an internal combustion engine, comprising:
    flowing the exhaust gas through one or a plurality of dedicated exhaust conduits;
    adsorbing NOx in the exhaust gas onto adsorbent sites within the one or a plurality of dedicated exhaust conduits;
    periodically flowing a reducing gas into one or a plurality of dedicated secondary conduits, wherein the one or a plurality of dedicated exhaust conduits and the one or a plurality of dedicated secondary conduits are in fluid communication with each other along their length through pores that extend through walls that separate the one or a plurality of dedicated exhaust conduits and the one or a plurality of dedicated secondary conduits; and
    introducing the reducing gas from the one or a plurality of dedicated secondary conduits into the one or a plurality of dedicated exhaust conduits through the pores that extend through the walls that separate the one or a plurality of dedicated exhaust conduits and the one or a plurality of dedicated secondary conduits, wherein during the step of flowing the reducing gas, NOx is desorbed from the adsorbent sites and reduced, or NOx is desorbed from the adsorbent sites, or NOx is reduced.

2. The method of claim 1, wherein the reducing gas comprises a slipstream of exhaust gas and a gas selected from the group consisting of hydrocarbon, carbon monoxide, hydrogen, evaporated urea, ammonia, and a combination thereof.

3. The method of claim 1, wherein the reducing gas comprises CO.

4. The method of claim 1, wherein the engine is a diesel engine.

5. The method of claim 1, wherein a gas pressure of the reducing gas in the one or a plurality of dedicated secondary conduits is higher than a gas pressure of the exhaust gas in the one or a plurality of dedicated exhaust conduits.

6. The method of claim 1, wherein flowing the reducing gas comprises periodically changing a flow rate of the reducing gas.

7. The method of claim 6, wherein a flow rate of the reducing gas periodically alternates between no flow and a flow rate of up to 10% of a total exhaust flow rate of the engine.

8. The method of claim 7, wherein the flow rate of the reducing gas periodically alternates between no flow and a flow rate of up to 5% of the total exhaust flow rate.

9. The method of claim 7, wherein the flow rate of the reducing gas periodically alternates between no flow and a flow rate of up to 2% of the total exhaust flow rate.

10. The method of claim 1, wherein the reducing gas comprises one or more constituents selected from the group consisting of hydrocarbon, carbon monoxide, hydrogen, evaporated urea, and ammonia.

11. The method of claim 10, wherein the hydrocarbon comprises evaporated diesel, or evaporated gasoline.

12. The method of claim 1, wherein a surface of a wall of the one or a plurality of dedicated exhaust conduits comprise adsorption sites.

13. The method of claim 12, wherein surfaces of the poses comprise adsorption sites, the pores extending through the walls that separate the one or a plurality of dedicated exhaust conduits and the one or a plurality of dedicated secondary conduits.

14. The method of claim 12, wherein the adsorption sites comprise $BaCO_3$.

15. The method of claim 1, wherein a surface of walls of the one or a plurality of dedicated exhaust conduits comprise active catalytic sites.

16. The method of claim 15, wherein the active catalytic sites comprise Pt, Pd, or Rh, or a combination thereof.

17. A method for reducing NOx emissions from the exhaust gas from an internal combustion engine, comprising:
   adsorbing NOx in the exhaust gas at surface adsorption sites in dedicated exhaust conduits; and
   periodically introducing at least one reducing agent into the dedicated exhaust conduits from a source or supply of reducing agent via a plurality of pores that extend through walls of the dedicated exhaust conduits along their length, thereby reducing NOx with at least one reducing agent; and
   wherein periodically introducing a reducing agent comprises periodically flowing at least one reducing agent into one or a plurality of dedicated secondary conduits, the dedicated secondary conduits being in fluid communication with the dedicated exhaust conduits via said plurality of pores that extend through walls that separate the dedicated secondary conduits and the dedicated exhaust conduits.

18. The method of claim 17, wherein a flow rate of the at least one reducing agent periodically alternates between no flow and a flow rate of up to 10% of a total exhaust flow rate.

19. The method of claim 17, wherein the flow rate of the at least one reducing agent periodically alternates between no flow and a flow rate of up to 5% of the total exhaust flow rate.

20. The method of claim 17, wherein the flow rate of the at least one reducing agent periodically alternates between no flow and a flow rate of up to 2% of the total exhaust flow rate.

21. The method of claim 17, wherein the at least one reducing agent comprises a slipstream of exhaust gas and a gas selected from the group consisting of hydrocarbon, carbon monoxide, hydrogen, evaporated urea, ammonia, and a combination thereof.

22. The method of claim 17, wherein the at least one reducing agent comprises CO.

23. The method of claim 17, wherein the surface adsorption sites comprises $BaCO_3$.

24. The method of claim 17, wherein surfaces of pores that extend through the walls of the dedicated exhaust conduits comprise adsorption sites.

25. The method of claim 17, wherein the at least one reducing agent is forced into the one or a plurality of dedicated exhaust conduits by increasing a pressure of the at least one reducing agent in the one or a plurality of dedicated secondary conduits.

26. The method of claim 17, wherein the at least one reducing agent is selected from the group consisting of hydrocarbon, carbon monoxide, hydrogen, evaporated urea, ammonia, and a combination thereof.

27. The method of claim 26, wherein the hydrocarbon comprises evaporated diesel, or evaporated gasoline.

28. The method of claim 17, wherein a surface of the walls of the dedicated exhaust conduits comprises active catalytic sites.

29. The method of claim 28, wherein the active catalytic sites comprise Pt, Pd, or Rh, or a combination thereof.

30. An exhaust structure for an internal combustion engine, comprising:
   one or a plurality of dedicated exhaust conduits in fluid communication with the engine to receive exhaust gas from an internal combustion reaction;
   one or a plurality of dedicated secondary conduits, wherein each dedicated exhaust conduit is in fluid communication with at least one dedicated secondary conduit via a plurality of pores that extend through walls separating the one or a plurality of dedicated exhaust conduits and the one or a plurality of dedicated secondary conduits; and
   a reducing agent reservoir in fluid communication with said one or a plurality of dedicated secondary conduits.

31. The exhaust structure of claim 30, wherein the one or a plurality of dedicated secondary conduits are in fluid communication with the engine to receive a slipstream of the exhaust gas and a gas selected from the group consisting of hydrocarbon, carbon monoxide, hydrogen, evaporated urea, ammonia, and a combination thereof.

32. The exhaust structure of claim 30, wherein the engine is a diesel engine.

33. The exhaust structure of claim 30, wherein the reducing agent is selected from the group consisting of hydrocarbon, carbon monoxide, hydrogen, urea, ammonia, and a combination thereof.

34. The exhaust structure of claim 33, wherein the hydrocarbon comprises evaporated diesel or evaporated gasoline.

35. The exhaust structure of claim 30, wherein surfaces of walls of the one or a plurality of dedicated exhaust conduits comprise adsorption sites.

36. The exhaust structure of claim 35, wherein the adsorption sites comprise $BaCO_3$.

37. The exhaust structure of claim 30, wherein surfaces of walls of the one or a plurality of dedicated exhaust conduits comprise active catalytic sites.

38. The exhaust structure of claim 37, wherein the active sites comprise Pt, Pd, or Rh, rare earth oxides or a combination thereof.

39. An apparatus which comprises the exhaust structure of claim 30 and an internal combustion engine in fluid communication therewith.

40. The apparatus of claim 39, which is an automotive vehicle.

41. A method for reducing NOx emissions from the exhaust gas from an internal combustion engine, comprising:
   introducing exhaust gas into a plurality of dedicated exhaust conduits;
   adsorbing NOx in the exhaust gas at surface adsorption sites in pores that extend through walls that separate the dedicated exhaust conduits and dedicated secondary conduits, wherein the exhaust conduits are in fluid communication with a plurality of dedicated secondary conduits via the pores, and
   periodically introducing at least one reducing agent via a plurality of the dedicated secondary conduits into the pores, thereby reducing NOx with at least one reducing agent.

* * * * *